Figure 1:
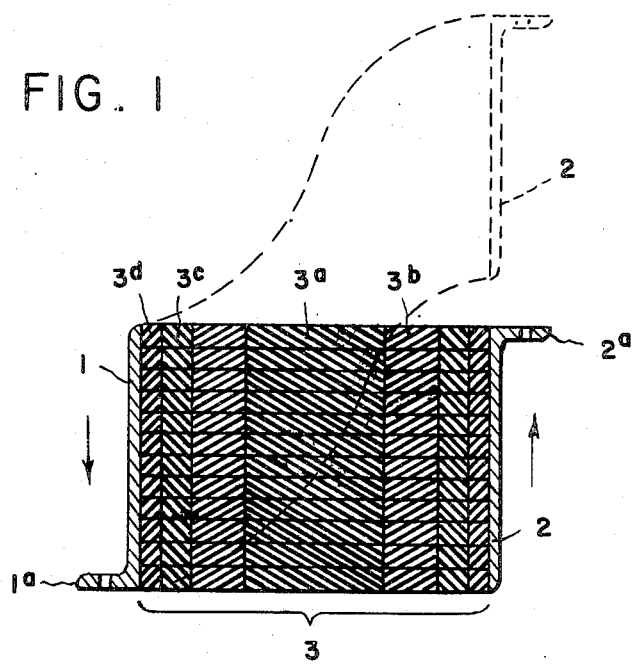

July 17, 1951

A. BOSCHI 2,560,627

COMBINATION METAL AND RUBBER STRUCTURE

Filed Aug. 1, 1947

INVENTOR
Antonio Boschi,

BY *Stone, Boyden & Mack*
ATTORNEYS.

Patented July 17, 1951

2,560,627

UNITED STATES PATENT OFFICE 2,560,627

COMBINATION METAL AND RUBBER STRUCTURE

Antonio Boschi, Milan, Italy, assignor to Società Applicazioni Gomma Antivibranti, Milan, Italy Application August 1, 1947, Serial No. 765,356
In Italy January 17, 1946

Section 1, Public Law 690, August 8, 1946
Patent expires January 17, 1966

10 Claims. (Cl. 267—63)

This invention relates to flexible rubber supports for metal frames and springs and it pertains particularly to combined rubber and metal products in which the rubber is subjected to shear flection stress and has variable deformability at different zones within the support.

Heretofore, structures have been used in which the supports between two members adapted to have a certain limited movement with respect to each other have been subjected to a shear flection stress, as, for example, such as is shown in the accompanying drawing. Prior to the present invention, structures have been used in which there are two metal frame members, both of which are secured to an intermediate rubber cushion, as, for example, being bonded thereto, and which cushion is subjected to restricted flow in its own plane. It has the same degree of stiffness throughout its length from frame member to frame member. It will be clear that the rubber-metal bond between the cushion and the two metal frame members is subjected to a real shearing stress. It will also be clear that beyond a given deformation, such as is indicated in the dotted line positions in the drawing, the bond is subjected to a traction stress due to the deformation which the length of the rubber cushion is required to take up. This increases considerably the stress on the rubber-metal bond and reduces the maximum specific stress to which the support or the entire structure may be subjected.

In contrast to such undesirable factors characteristic of prior forms, the present invention provides for a differentiation of the rubber cushion stiffness across its length. More specifically, the rubber cushion which is bonded to the metal frame members at its marginal edges provides a high stiffness which diminishes progressively toward the center of the cushion. In this way, the resultant deformation curve is not straight between the two metal frame members but it assumes an S-shaped curve, as shown in the dotted line position in Fig. 1. It follows that the rubber-metal bond is subjected to a shear stress, but not to traction under such a very disadvantageous angle as is the case in the earlier forms. Therefore, the load to which the support may be subjected can be increased with safety.

The construction may assume any shape, as, for instance, it may be either open (if straight or curved) or closed in itself (if circular or polygonal).

Figure 2:
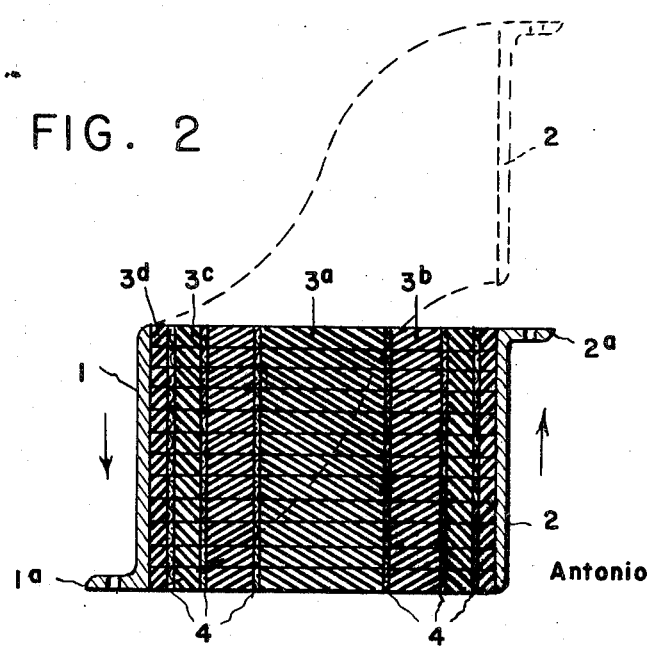

The foregoing construction and advantages inherent to the construction of the present invention are explained and defined in the following specification and claims and the construction is illustrated in the accompanying drawing, in which:

Fig. 1 is a sectional view of a pair of metal frame members secured at the opposite edges of the improved type of rubber cushion of this invention; and Fig. 2 is a sectional view similar to that of Fig. 1 but illustrating the use of fabric between the rubber zones.

In both Figs. 1 and 2, two metal frame members are indicated in spaced relation to each other, as at 1 and 2. Shown at the lower edge of the frame member 1 is a laterally projecting flange 1$^a$ having openings therethrough for the reception of suitable fastening bolts, not shown. At the upper edge of the frame member 2 is a similar lateral extending flange 2$^a$, likewise having openings therethrough for the reception of fastening bolts (not shown). The adjacent and opposed faces of the frame members 1 and 2 are secured by bonding to a rubber cushion 3, which may be unitary but preferably is formed of a plurality of layers as illustrated. The cushion has peculiar characteristics as will now be described. 3 denotes the entire cushion extending between the adjacent faces of the frame members 1 and 2. The cushion is peculiar in that the portions thereof next adjacent the frame members 1 and 2 possess a greater degree of stiffness than the central portion of the rubber cushion. Furthermore, the degree of stiffness diminishes progressively from the outer edge of the cushion progressively toward the center. More specifically, that area of zone 3$^d$ next adjacent the frame members 1 and 2 possesses the greatest stiffness. The next adjacent zone inwardly 3$^c$ has a slightly less degree of stiffness. The third zone 3$^b$ has a degree of stiffness less than that of the zone 3$^c$ and finally the fourth zone 3$^a$, which is the central zone, as shown in Fig. 2 has the least stiffness. In short, the zones are simmetrically disposed and have different degrees of stiffness progressively from the region of the frame members 1 and 2 toward the center. It will be observed that the zones 3$^a$, 3$^b$, 3$^c$ and 3$^d$ are progressively narrower from the center toward the edges and the members 1 and 2.

When the structure illustrated is subjected to deformation during use, the rubber cushion 3, which comprises the entire block between the frame members 1 and 2, will assume a shape which is peculiar in that it resists bending at the edges next adjacent the frame members while bending more freely and yieldingly in the center portion. Thus, the structure shown will assume a shape similar to that indicated in dotted lines. This resultant contour is believed to be due to the different degrees of stiffness of the rubber cushion in the several zones.

The different degrees of stiffness in the block may be obtained by several methods. As already described, the composition of the rubber in each of the zones of the block is chosen preferably so as to provide progressively varying degrees of stiffness. According to another method, more or less fabric may be located between the rubber zones as shown at 4 in Fig. 2. The amount of fabric can be so selected and built in that the stiffness can be predetermined.

It will be clear that fabric can be used within the product to connect nearby and adjacent zones having different stiffness.

I claim:

1. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of transversely extending zones of rubber-like material of differing degrees of stiffness disposed between said central zone and each of said opposed faces, the material in each of the several zones being of different composition, bonding material disposed between adjacent zones of rubber-like material, said bonding material lying in planes parallel to said opposed faces, the stiffness of the rubber-like material in the several zones being progressively and symmetrically greater from the central zone toward said opposed faces.

2. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of transversely extending zones of rubber-like material disposed between said central zone and each of said opposed faces, the material in each of the several zones being of different composition, fabric material disposed between adjacent zones of rubber-like material and bonded thereto, said fabric material lying in planes parallel to said opposed faces, the thickness of the fabric material disposed between the several zones of rubber-like material being progressively and symmetrically thinner from the central zone toward said opposed faces.

3. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of zones of rubber-like material of differing degrees of stiffness disposed between said central zone and each of said opposed faces, the material in each of the several zones being of different composition, fabric material disposed between adjacent zones of rubber-like material and bonded thereto, said fabric material lying in planes parallel to said opposed faces, the stiffness of the rubber-like material in the several zones being progressively and symmetrically greater from the central zone toward said opposed faces, the thickness of the fabric material disposed between said zones being progressively and symmetrically thinner from the central zone toward said opposed faces.

4. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of symmetrically disposed transversely extending zones of rubber-like material between said central zone and said opposed faces, the material in each of the several zones being of different composition, the stiffness of the rubber-like material in the several zones being progressively greater from the central zone toward said opposed faces, and means forming a bond between the several zones.

5. A combination as defined in claim 1, in which the width of the several zones of rubber-like material is progressively and symmetrically narrower in a direction from the central zone toward said opposed faces.

6. A combination as defined in claim 2, in which the width of the several zones of rubber-like material is progressively and symmetrically narrower in a direction from the central zone toward said opposed faces.

7. A combination as defined in claim 3, in which the width of the several zones of rubber-like material is progressively and symmetrically narrower in a direction from the central zone toward said opposed faces.

8. A combination as defined in claim 4, in which the width of the several zones of rubber-like material is progressively narrower in a direction from the central zone toward said opposed faces.

9. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of transversely extending zones of rubber-like material of differing degrees of stiffness disposed between said central zone and each of said opposed faces, bonding material disposed between adjacent zones of rubber-like material, said bonding material lying in planes parallel to said opposed faces, the stiffness of the rubber-like material in the several zones being progressively and symmetrically greater from the central zone toward said opposed faces, the width of the several zones being progressively narrower in a direction from the central zone toward said opposed faces.

10. In combination, spaced plate members provided with opposed substantially parallel face portions adapted for relative movement in a direction parallel to said faces, a composite elastic block extending between the opposed faces and bonded thereto, said elastic block comprising a central zone of rubber-like material, a plurality of symmetrically disposed transversely extending zones of rubber-like material between said central zone and said opposed faces, the stiffness of the rubber-like material in the several zones being progressively greater from the central zone toward said opposed faces, the width of the several zones being progressively narrower in a direction from the central zone toward said opposed faces, and means forming a bond between the several zones.

ANTONIO BOSCHI.

REFERENCES CITED

The following references are of record in the file of this patent:

UNITED STATES PATENTS

| Number | Name | Date |
| --- | --- | --- |
| 131,671 | Eils | Sept. 24, 1872 |
| 2,099,031 | Neal et al. | Nov. 16, 1937 |
| 2,126,707 | Schmidt | Aug. 16, 1938 |
| 2,187,706 | Julien | Jan. 16, 1940 |
| 2,383,645 | Hahn | Aug. 28, 1945 |